Patented Feb. 9, 1954

2,668,753

UNITED STATES PATENT OFFICE 2,668,753

PRODUCTION OF HYDROGEN PEROXIDE

Charles R. Harris, Lockport, and Jerome W. Sprauer, Niagara Falls, N. Y., assignors to E. I. du Pont de Nemours & Company, Wilmington, Del., a corporation of Delaware No Drawing. Application November 5, 1949, Serial No. 125,847

13 Claims. (Cl. 23—207)

This invention relates to a method for the production of hydrogen peroxide using alkylated anthraquinones as intermediates.

U. S. Patent 2,158,525 discloses a process for the production of hydrogen peroxide wherein an alkylated anthraquinone is hydrogenated in a solvent by means of hydrogen in the presence of a catalyst to the corresponding anthrahydroquinone which, after separation of the catalyst, is oxidized by means of oxygen to produce hydrogen peroxide. The anthraquinone is regenerated during the oxidation and is recycled to the hydrogenation stage after first removing the product hydrogen peroxide, e. g., by aqueous extraction. The present invention relates to an improvement of this process. More particularly, it relates to the practice of such a process employing improved solvents.

Various solvents may be used in carrying out such processes and it is obviously advantageous to employ the same solvent in both the hydrogenation and oxidation stages. Solvents which are mixtures of two or more substances, one of which is a good solvent for the anthraquinone and another a good solvent for the anthrahydroquinone, have been proposed in U. S. Patent 2,215,883. Mixtures of benzene, toluene or xylene with an alcohol such as amyl alcohol, isoheptyl alcohol or methylcyclohexanol, are stated to be suitable. However, these are not entirely satisfactory for various reasons. Thus, the solubilities of the organic intermediates in these solvents are relatively low whereas water solubility is too high. Also, these solvents have relatively high vapor pressures, presenting serious fire and explosion hazards and resulting in solvent losses unless expensive precautions are taken to recover solvent vapors.

One object of this invention is to provide an improved cyclic process for the production of hydrogen peroxide wherein alkylated anthraquinones are employed as intermediates. A further object is to provide improved solvents for use in such a process. These and further objects will be apparent from the following description.

The above objects are accomplished in accordance with the invention by employing as a solvent in a process of the type indicated, a mixture of a primary or a secondary nonyl alcohol with a monomethyl- or a dimethylnaphthalene. The solvent mixture should contain a substantial amount, i. e., at least 20% by volume, of one or more of such alcohols and also a substantial amount, i. e., at least 20% by volume, of one or more of such naphthalenes. The solvent mixture may also contain other solvent substances, such as those disclosed in Patent 2,215,883. However, the preferred mixtures will contain no other solvent substance, or at most not more than about 5%.

It has been discovered that the above saturated, acyclic nonyl alcohols are excellent solvents for the organic intermediates in the reduced state, that the above naphthalenes are excellent solvents for the organic intermediates in the oxidized state and that mixtures containing the alcohol and naphthalene in the preferred proportions are outstanding solvents for the intermediates in both the reduced and oxidized states. When using the same solvent in both the hydrogenation and oxidation stages it is essential that the organic intermediates be soluble to a practical extent in the solvent in both stages. If the solvent mixture contains less than about 20% of the alcohol, the solubility of the reduced intermediates will generally be too low to be practical, whereas if the solvent contains less than about 20% of the naphthalene, solubility of the oxidized intermediates will be impractically low. These minimum proportions will vary somewhat depending upon the particular intermediates involved. Proportion ranges reasonably suitable for most of the alkylated anthraquinones and their corresponding anthrahydroquinones are 25 to 75% of the alcohol and 75 to 25% by volume of the substituted naphthalene. The preferred ranges are 65 to 35% of the former and 35 to 65% of the latter. The specific proportion most suitable in any given instance will depend somewhat upon the particular intermediates involved, including ring hydrogenated derivatives. In general, the higher the concentration of the latter, the higher should be the proportion of the substituted naphthalene in the solvent.

The present solvent mixtures are characterized by their high chemical stabilities, high boiling points and low vapor pressures. They are relatively non-toxic, particularly with reference to solvents containing benzene. Due to their low vapor pressure, their use at temperatures commonly employed in such processes involves no serious fire hazard. Also, because of their low vapor pressure, air is entirely satisfactory and is preferred as the source of oxygen in the oxidation stage. When air is used in processes employing solvents containing such low boiling materials as benzene, solvent vapor recovery from the by-product nitrogen is necessary and expensive. In contrast, when the present solvents are used, solvent vapor recovery is not necessary when using air. Another important advantage of using the present solvent mixtures is that they have outstandingly high hydrogen peroxide distribution coefficients which aid substantially in the extraction of hydrogen peroxide from the working solution. Also, solubility of water in the mixtures is low.

A further and important characteristic of these solvent mixtures is the unexpectedly high solubilities therein of the alkylated anthraquinones, the corresponding anthrahydroquinones and also the tetrahydro alkylated anthraquinones and their corresponding anthrahydroquinones. These high solubilities permit working with concentrations of the intermediates which give economical and high concentrations of hydrogen peroxide by direct extraction methods without having to resort to expensive vaporization and concentrating methods.

The present solvent mixtures may be used advantageously when employing as the organic intermediates any alkylated anthraquinone and its corresponding anthrahydroquinone, or any tetrahydro alkylated anthraquinone and its corresponding anthrahydroquinone. Specific examples of suitable anthraquinones are 2-ethyl-, 2-isopropyl-, 2-secondary-butyl-, 2-tertiary-butyl-, 2-secondary-amyl-, 1,3-dimethyl-, 2,3-dimethyl-, 1,4-dimethyl- and 2,7-dimethyl-anthraquinone. Use of the solvent mixture is preferred however in systems in which the starting intermediate is 2-tertiary-butylanthraquinone. This compound has an unusually high solubility in the present solvent mixtures whether it be present in the oxidized or reduced state. It is much more soluble in the present systems than is 2-ethylanthraquinone, the previously preferred anthraquinone. 2-tertiary-butylanthraquinone is also exceedingly stable under the conditions encountered and its use is distinctly preferred. When using this anthraquinone in the preferred solvent mixtures aqueous hydrogen peroxide having an $H_2O_2$ concentration of 35 to 40% by weight may be obtained directly by practical countercurrent extraction methods. The use of 2-tertiary-butyl-anthraquinone in processes of this type is disclosed in the copending application of Hinegardner, Serial No. 125,831, filed November 5, 1949.

The following examples demonstrate various of the outstanding properties of the present solvent mixtures and of the preferred alkylated anthraquinone and their use in a cyclic process for the obtainment of hydrogen peroxide.

Example 1

The solubilities of 2-ethylanthraquinone and 2-tertiary-butylanthraquinone in a solvent mixture consisting of 60% diisobutylcarbinol and 40% benzene by volume was determined by dissolving a known weight of the anthraquinone in the smallest amount of the solvent required to completely dissolve the material at 30° C. The densities of the resulting solutions were determined and from the proportions of solute to solvent therein the solubilities of 2-ethylanthraquinone and 2-tertiary-butylanthraquinone in terms of grams per liter of solution were calculated to be 130 and 265 g., respectively.

Example 2

A solution of 2-ethylanthraquinone in the solvent of Example 1 containing 100 g. per liter of the quinone was prepared. Aliquots were hydrogenated under conditions to measure the maximum amount of hydrogen absorbed without precipitation of the anthrahydroquinone occurring. In this way it was found that the solubility of 2-ethylanthrahydroquinone at about 30° C. was about 35 g. per liter. The solubility of 2-tertiary-butylanthrahydroquinone determined in the same manner using 250 g. per liter of the anthraquinone in the same solvent was found to be 100 g. per liter at 30° C.

Example 3

The solubilities of 2-tertiary-butylanthraquinone and 2-ethylanthraquinone in a solvent mixture consisting of 40% alpha-methylnaphthalene and 60% by volume diisobutylcarbinol were found to be 293 and 150 grams per liter of solution, respectively, at 30° C. The results of this example demonstrate that 2-tertiary-butylanthraquinone is outstandingly more soluble in the present solvent mixtures than is 2-ethylanthraquinone. A comparison of the results of this example with those of Example 1 also shows that the presence of alpha-methylnaphthalene in place of benzene increases substantially the solubility of either anthraquinone.

Example 4

Quantitative hydrogenation at about 30° C. of a solution of 100 g. per liter of 2-ethylanthraquinone in a 60% diisobutylcarbinol-40% alpha-methylnaphthalene solvent mixture by the method described in Example 2 resulted in a solution containing about 52 g. per liter of 2-ethylanthrahydroquinone. In contrast, a solution of 175 g. per liter of 2-tertiary-butylanthraquinone in the same solvent could be hydrogenated to contain 114 g. per liter of the anthrahydroquinone without precipitation occurring.

Quantitative hydrogenation of a solution of 175 g. per liter of 2-tertiary-butylanthraquinone in a mixture of 60% 3,5,5-trimethylhexanol-1 and 40% alpha-methylnaphthalene by volume at 30° C. by the method of Example 2 resulted in a solution containing 110 g. per liter of 2-tertiary-butylanthrahydroquinone without precipitation occurring.

Example 5

A mixture of 60% diisobutylcarbinol and 40% by volume alpha-methylnaphthalene was added to an equal volume of 10% aqueous hydrogen peroxide and the two layers shaken together at 30° C. until equilibrium was reached. Aliquots from each layer were analyzed for hydrogen peroxide and the distribution coefficient of hydrogen peroxide between the aqueous and organic phases was calculated by dividing the concentration of hydrogen peroxide in the aqueous phase by the concentration in the organic phase. This coefficient was found to be 95. In a similar manner a distribution coefficient of 55 was found for a 60% diisobutylcarbinol-40% beta-methylnaphthalene solvent. The corresponding value for a 60% diisobutylcarbinol-40% dimethylnaphthalene solvent was found to be 69. These results demonstrate that for mixtures of diisobutylcarbinol with monomethyl- or dimethylnaphthalene, the use of alpha-methylnaphthalene in such mixtures increases substantially the distribution coefficient.

When benzene was substituted for the methylnaphthalenes in the solvents of the above example, the distribution coefficient was 55.

The distribution coefficient of hydrogen peroxide between the aqueous and organic phases of a mixture of a 10% aqueous solution of hydrogen peroxide in equilibrium with a 1:1 volume mixture of heptanol-2 with benzene was found to be 28. Corresponding values found when substituting diisopropylcarbinol and octanol-2 for heptanol-2 were 41 and 36, respectively.

*Example 6*

A mixture of equal parts by volume of methylcyclohexanol and benzene was shaken with an equal volume of aqueous 10% hydrogen peroxide until equilibrium was established at 30° C. The hydrogen peroxide distribution coefficient determined as described previously was 18.

*Example 7*

A preferred working solution was prepared containing 175 g. per liter of 2-tertiary-butylanthraquinone using a solvent consisting of 60% diisobutylcarbinol and 40% by volume alpha-methylnaphthalene. This solution was shaken with an equal volume of 35% aqueous hydrogen peroxide. After equilibrium was reached at 30° C. both layers were analyzed for hydrogen peroxide and from the data obtained a distribution coefficient of 40 was found. The distribution coefficient for the same working solution with 10% aqueous hydrogen peroxide is about 52. When a commercial mixture of methyl naphthalenes was used in place of alpha-methylnaphthalene in the above preferred working solution, the distribution coefficient was 36 for 35% aqueous hydrogen peroxide.

*Example 8*

About five liters of a working solution was made up to contain 175 g. of 2-tertiary-butylanthraquinone per liter in a solvent consisting of alpha-methylnaphthalene and diisobutylcarbinol in a volume ratio of 40 to 60. The solution was charged into a cyclic system in which it was circulated at approximately 20 cc. per minute, first through a hydrogenator and then to an oxygenator and finally an extractor for removing the hydrogen peroxide. An activated alumina supported palladium catalyst was used in the hydrogenator and this catalyst was separated from the solution before the latter was passed to the oxygenator. After the extraction the solution was returned to the hydrogenator and this cycle of operation was continued for 1975 hours during which time 26,000 g. of $H_2O_2$ was prepared. During this time, approximately 13% of the anthraquinone had been converted into non-usable by-products. This corresponded to an anthraquinone loss equivalent to only 0.005 g. per gram of 100% $H_2O_2$.

*Example 9*

A working solution which had been used several weeks and which analyzed 8.4% 2-tertiary-butylanthraquinone, 5.0% tetrahydro-2-tertiary-butylanthraquinone, 5.8% unidentified solute, 28.5% diisobutylcarbinol and 52.0% alpha-methylnaphthalene, was found to have hydrogen peroxide distribution coefficients of about 84 and 58, respectively, with 10% and 30% aqueous hydrogen peroxide solutions.

The above working solution had been hydrogenated and oxidized continuously in a cyclic system and subjected to continuous countercurrent extraction in a column containing 40 sieve plates. It yielded consistently an extract containing 35 to 40% by weight $H_2O_2$ representing a recovery of at least 90% of the hydrogen peroxide contained in the oxidized working solution.

Temperatures and pressures previously suggested for processes of this type may be used. Hydrogenation usually will be carried out at 20 to 40° C., a temperature of 25 to 35° being preferred. Higher temperatures, e. g., up to about 50° C., may be used, but such higher temperatures appear to accelerate by-product formation. Temperatures during oxidation will usually be within the range 30 to 60° C., 40 to 50° C. being preferred. However, temperatures outside these ranges may be used.

It is desirable to employ as high a concentration of the organic intermediate in the working solution as is possible without precipitation occurring at any point in the cycle. When employing the preferred anthraquinone, working solutions containing as high as around 300 g. per liter as the anthraquinone can be obtained. Generally the concentrations will range from 100 to 300 g. per liter. Factors which should be considered in choosing the concentration to be used include the solubility of the hydrogenated intermediate at the temperature to be used and the extent to which it is desired to carry out the hydrogenation. In processes of this type, it is generally most practical to hydrogenate only part of the anthraquinone, using higher concentrations of the anthraquinone than would be possible if hydrogenation were carried to completion. The density of the resulting solution should also be considered when choosing the anthraquinone concentration to be used. Considering all of these factors, we prefer when the anthraquinone used is 2-tertiary-butylanthraquinone, to employ a concentration of about 150 to 250 g. per liter and to hydrogenate to only about 40 to 65% of the theoretical.

As is well known, when starting with any alkylated anthraquinone, slow hydrogenation of one of the aromatic rings occurs as a side reaction so that tetrahydroanthraquinone builds up generally to a somewhat steady state. Thus, when using 2-tertiary-butylanthraquinone, tetrahydro-2-tertiary-butylanthraquinone is slowly formed. At the higher concentrations of quinones, depending upon the temperature and total quinone concentration, the tetrahydro compound will precipitate out and can be removed. Tetrahydro-2-tertiary-butylanthraquinone also produces hydrogen peroxide in the reduction-oxidation cycle. Despite the fact that it is oxidized with greater difficulty, a substantial concentration thereof, e. g., equivalent to about 10 to 40% of the total quinone values, is usually desirable since it increases the total anthrahydroquinone that can be held in solution and thus permits increasing the peroxide concentration in the aqueous extract. What has been said with reference to tetrahydro-2-tertiary-butylanthraquinone is also in general applicable to the tetrahydro derivatives of other alkylated anthraquinones. Because of this tendency of the alkylated anthraquinones to ring hydrogenate, the present working solutions will always contain some of the tetrahydro compound after the solution has been in use for a time.

The above nonyl alcohols in combination with, for example, alpha-methylnaphthalene are better solvents for the organic intermediates than are the higher aliphatic alcohols. They are also superior to the lower alcohols in possessing a combination of better hydrogen peroxide distribution coefficient, lower solubility in water and in dissolving less water. The preferred alcohol is diisobutylcarbinol. Although any mono-methyl- or dimethylnaphthalene may be used as the naphthalene constituent of the solvent, alpha-methylnaphthalene is outstanding and is preferred.

Any suitable hydrogenation catalyst may be used in the hydrogenation stage. Nickel catalysts have heretofore been generally regarded as most suitable and may be employed. However, palladium supported on activated alumina is a more effective and practical catalyst and its use is preferred. The use of activated alumina-supported palladium catalysts is described in the copending application of Sprauer, Serial No. 125,848, filed November 5, 1949.

We claim:

1. In a cyclic process for the production of hydrogen peroxide wherein a substance from the group consisting of alkylated anthraquinones, tetrahydro alkylated anthraquinones and mixtures thereof, is hydrogenated to form a substance from the group consisting of alkylated anthrahydroquinones, tetrahydro alkylated anthrahydroquinones and mixtures thereof, which is oxidized to produce hydrogen peroxide and to regenerate said first named substance for recycling in the process, the improvement which comprises employing as solvent in both the reduction and oxidation steps of said process a mixture comprising a substance from the group consisting of the primary and secondary nonyl alcohols and mixtures thereof, and a substance from the group consisting of the monomethyl- and dimethyl-substituted naphthalenes and mixtures thereof.

2. The process of claim 1 employing as the solvent a mixture in which the volume percentages of nonyl alcohol and substituted naphthalene are within the ranges 25 to 75% and 75 to 25%, respectively.

3. The process of claim 1 employing as solvent a mixture in which the volume percentages of nonyl alcohol and substituted naphthalene are within the ranges of 65 to 35 and 35 to 65, respectively.

4. The process of claim 2 employing a solvent mixture containing alpha-methylnaphthalene.

5. The process of claim 2 employing a solvent mixture containing alpha-methylnaphthalene and diisobutylcarbinol.

6. The process of claim 2 employing a solvent mixture containing alpha-methylnaphthalene and 3,5,5-trimethylhexanol-1.

7. The process of claim 1 wherein the substance hydrogenated comprises a mixture of an alkylated anthraquinone with a substantial amount of the corresponding tetrahydro alkylated anthraquinone.

8. The process of claim 7 wherein the proportion of tetrahydro alkylated anthraquinone in the mixture hydrogenated is 10 to 40% of the total alkylated anthraquinone content.

9. In a process for the production of hydrogen peroxide wherein an alkylated anthraquinone intermediate is hydrogenated in solution in the presence of a catalyst to produce the corresponding anthrahydroquinone and the latter is oxidized to produce hydrogen peroxide and to regenerate said alkylated anthraquinone which is recycled, the improvement comprising employing 2-tertiary-butylanthraquinone as said intermediate dissolved in a solvent comprising a mixture of a substance from the group consisting of the primary and secondary nonyl alcohols and mixtures thereof and a substance from the group consisting of the monomethyl- and dimethyl-substituted naphthalenes and mixtures thereof.

10. The process of claim 9 employing as the solvent a mixture comprising 25–75% by volume of a substance from the group consisting of the primary and secondary nonyl alcohols and mixtures thereof, and 75–25% by volume of a substance from the group consisting of the monomethyl- and dimethyl-substituted naphthalenes and mixtures thereof.

11. The process of claim 10 wherein the solvent mixture contains alpha-methylnaphthalene as the substituted naphthalene constituent.

12. The method of claim 10 wherein the solvent comprises a mixture of 25–75% by volume of diisobutylcarbinol and 75–25% by volume of alpha-methylnaphthalene.

13. The method of claim 10 wherein the solvent comprises a mixture of 25–75% by volume of 3,5,5-trimethylhexanol-1 and 75–25% by volume of alpha-methylnaphthalene.

CHARLES R. HARRIS.
JEROME W. SPRAUER.

References Cited in the file of this patent

UNITED STATES PATENTS

| Number | Name | Date |
|---|---|---|
| 2,158,525 | Riedl et al. | May 16, 1939 |
| 2,215,883 | Riedl et al. | Sept. 24, 1940 |

FOREIGN PATENTS

| Number | Country | Date |
|---|---|---|
| 465,070 | Great Britaiin | Apr. 30, 1937 |